(12) United States Patent
Yang et al.

(10) Patent No.: US 8,625,262 B2
(45) Date of Patent: Jan. 7, 2014

(54) FRONT COVER AND MANUFACTURING METHOD

(75) Inventors: Nai-Lin Yang, New Taipei (TW); Xu-Dong Lu, Shenzhen (CN); Qiang Wang, Shenzhen (CN); Xiao-Meng Zhou, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 117 days.

(21) Appl. No.: 13/301,966

(22) Filed: Nov. 22, 2011

(65) Prior Publication Data

US 2012/0275096 A1    Nov. 1, 2012

(30) Foreign Application Priority Data

Apr. 28, 2011   (CN) .............. 2011 1 0108551

(51) Int. Cl.
*G06F 1/16* (2006.01)
(52) U.S. Cl.
USPC ............ 361/679.02; 312/244; 248/309.1; 439/135

(58) Field of Classification Search
USPC ............ 312/319.2, 223.1, 223.2, 244, 270.2, 312/323, 293.1, 237, 334.46; 248/213.2, 248/220.21, 124.1, 309.1, 220.22, 694, 71, 248/639, 282.1; 439/660, 352, 541.5, 492, 439/67, 135; 361/679.33, 679.34, 679.55, 361/679.27, 679.31, 679.26, 679.01, 361/679.52, 679.08, 679.48, 679.58, 361/679.39; 206/45.25, 45.24, 37, 778, 206/320, 449, 232, 521.1, 216
See application file for complete search history.

(56) References Cited

U.S. PATENT DOCUMENTS

| | | | | |
|---|---|---|---|---|
| 2007/0258198 | A1* | 11/2007 | Minaguchi et al. | 361/681 |
| 2010/0014232 | A1* | 1/2010 | Nishimura | 361/679.3 |
| 2010/0033912 | A1* | 2/2010 | Kondou | 361/679.01 |

* cited by examiner

*Primary Examiner* — Hung Duong
(74) *Attorney, Agent, or Firm* — Altis Law Group, Inc.

(57) ABSTRACT

A front cover includes a housing and a display window module. The housing defines an opening. The display window module includes a support plate and a liquid crystal display assembly. The support plate is integrally formed in the opening of the housing, and the liquid crystal display assembly is attached to the support plate.

7 Claims, 4 Drawing Sheets

FRONT COVER AND MANUFACTURING METHOD

BACKGROUND

1. Technical Field

The present disclosure generally relates to housing manufacturing, particularly to a front cover and a method for manufacturing the front cover.

2. Description of Related Art

A typical portable electronic device usually includes a front cover on a main body. Referring to FIG. 4, the front cover 200 includes a housing 220 and a display window module 240. The housing 220 defines an opening 222. The display window module 240 includes a fringe portion 242 and a protruding portion 244. When the display window module 240 is assembled on the housing 220, the fringe portion 242 is mounted on the housing 220 by adhesive, and the protruding portion 244 is received in the opening 222.

However, the opening 222 of the housing 220 easily reduces the strength and rigidity of the housing 220. Additionally, the fringe portion 242 is adhered to the housing 220. The thickness of the front cover 200 has to be increased. It cannot satisfy a tendency towards a thinner portable electronic device.

Therefore, there is room for improvement within the art.

BRIEF DESCRIPTION OF THE DRAWINGS

Many aspects of the front cover and the method for manufacturing the front cover can be better understood with reference to the following drawings. The components in the drawings are not necessarily to scale, the emphasis instead being placed upon clearly illustrating the front cover and the method for manufacturing the front cover. Moreover, in the drawings, like reference numerals designate corresponding parts throughout the several views.

DETAILED DESCRIPTION

Figure 1:
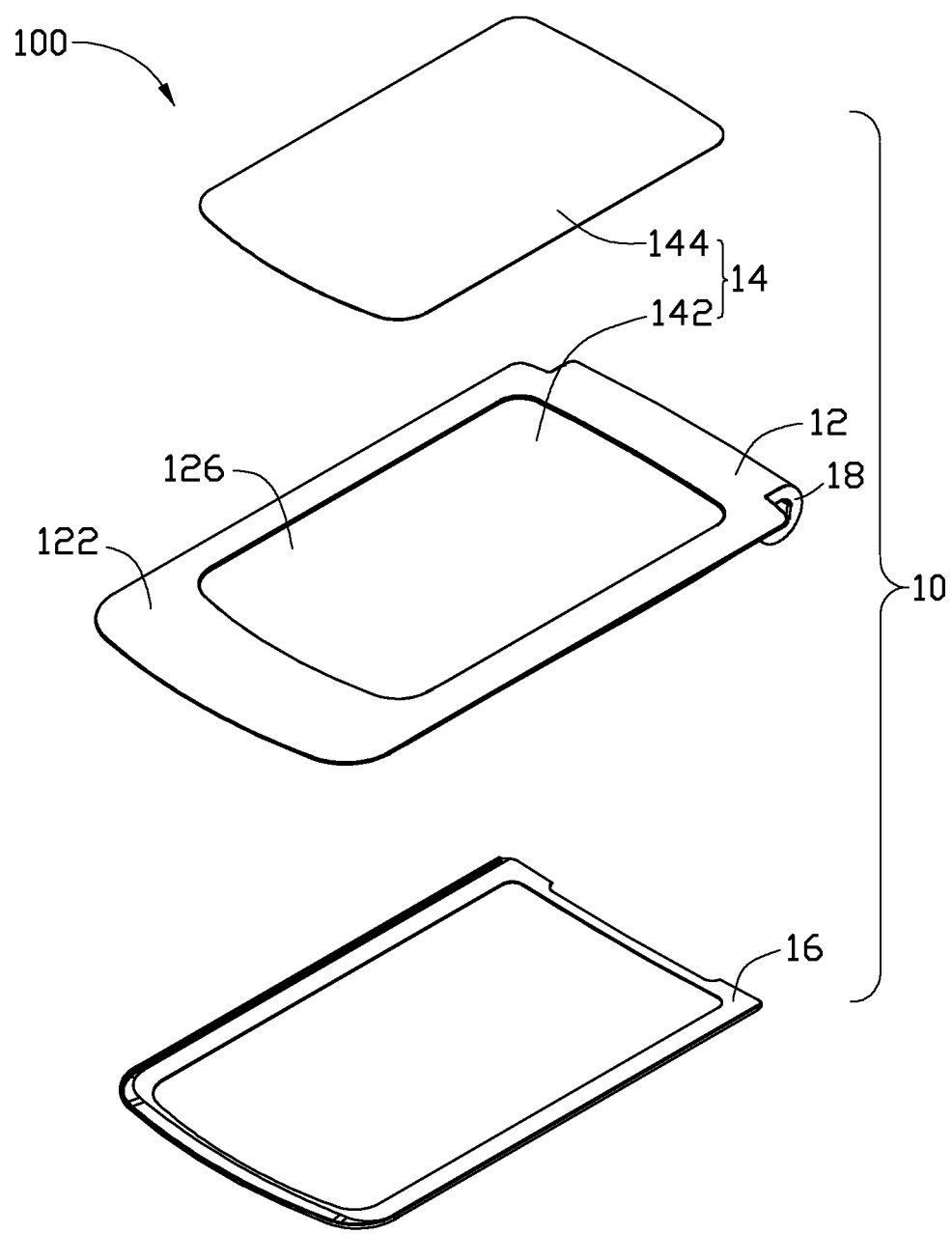
FIG. 1 is a schematic, exploded view of an exemplary embodiment of a front cover.

Referring to FIG. 1, in an exemplary embodiment, a front cover 10 of a portable electronic device 100 includes a housing 12, a display window module 14, a decorative member 16, and a hinge barrel 18. The display window module 14 is divided into two parts: one part is a support plate 142 and the other part is an LCD (liquid crystal display) optical and electric assembly 144. The support plate 142 is integrally formed with the housing 12 for supporting the LCD assembly 144. In this exemplary embodiment, the support plate 142 is made of transparent polycarbonate. The LCD assembly 144 is made of electronic and optical components for displaying information, and is attached on the support plate 142. The decorative member is mounted on the housing 12 opposite to the LCD assembly 144.

Figure 2:
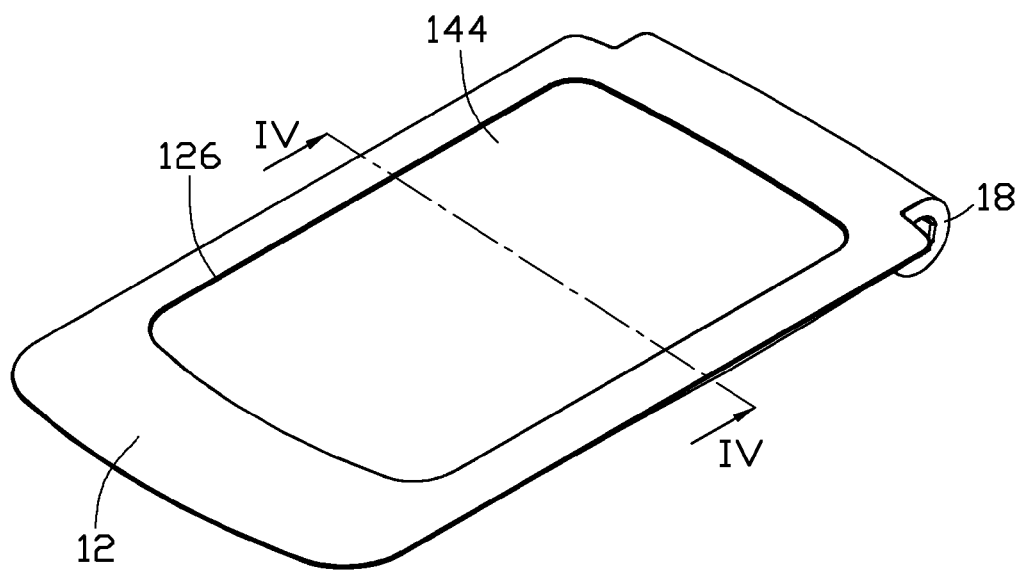
FIG. 2 is a schematic view of the assembly front cover.
Figure 3:
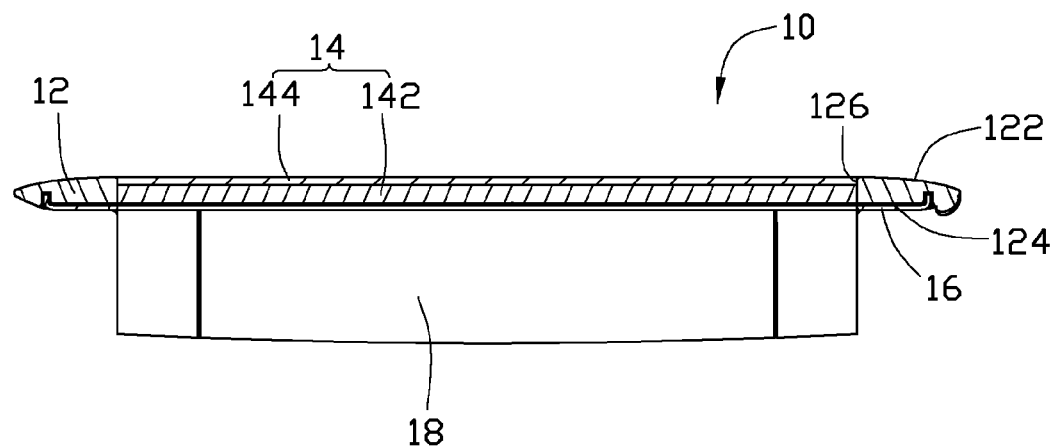
FIG. 3 is a cross-section of the assembly front cover shown in FIG. 2.
Figure 4:
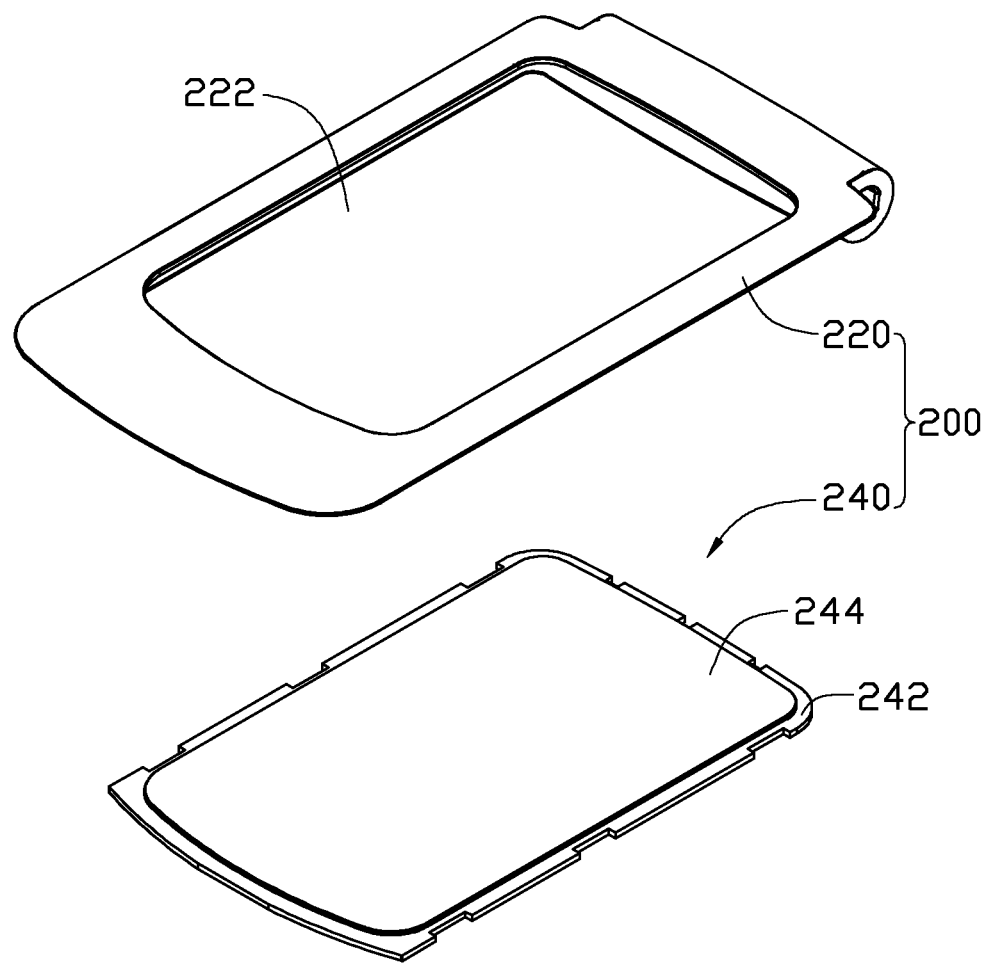
FIG. 4 is a schematic, exploded view of a conventional front cover.

The housing 12 is made of polycarbonate and glass fiber. Referring to FIGS. 2 and 3, the housing 12 includes a first surface 122 and an opposite second surface 124. The housing 12 defines an opening 126 communicating with the first surface 122 and the second surface 124. The support plate 142 is integrally formed in the opening 126 of the housing 142 by dual-material dual-injection molding, and one side of the support plate 142 is coplanar with the second surface 124.

The decorative member 16 is substantially a frame positioned around the display window module 14, and is adhered to the second surface 124 with adhesive.

The decorative member 16 is metal for improving appearance and strength of the housing 12.

A method for manufacturing the front cover 10 is described as follows.

An injection mold is provided. Two different materials are injected into a die chamber of the injection mold. After the injection molding process, the support plate 142 is embedded into the opening 126 of the housing 12. This effectively prevents the opening 126 from reducing the strength and rigidity of the housing 12, since the support plate is directly formed in the opening 126 of the housing 12. Then, the LCD assembly 144 is mounted on the support plate 142. The decorative member 16 is adhered to the second surface 124 with adhesive. The method for manufacturing the front cover 10 decreases the whole thickness.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A front cover comprising:
    a housing made of polycarbonate and glass fiber and defining an opening;
    a display window module including a support plate and a liquid crystal display assembly, the support plate made of transparent polycarbonate; and
    a decorative member mounted on the housing opposite to the liquid crystal display assembly;
    wherein the support plate is integrally formed in the opening of the housing, and one side of the support plate is coplanar with the housing, the liquid crystal display assembly is attached on the support plate.

2. The front cover as claimed in claim 1, wherein the housing includes a first surface and an opposite second surface, the opening communicates with the first surface and the second surface.

3. The front cover as claimed in claim 2, wherein the support plate is integrally formed in the opening of the housing by dual-material dual-injection molding, and one side of the support plate is coplanar with the second surface.

4. The front cover as claimed in claim 3, wherein the decorative member is substantially a frame positioned around the display window module, and is adhered to the second surface with adhesive.

5. The front cover as claimed in claim 1, wherein the liquid crystal display assembly is made of electronic and optical component for displaying information.

6. A method for manufacturing a front cover, comprising:
    injecting two different molten material into a die chamber of an injection mold to respectively form a housing and a support plate, with the support plate embedded into an opening of the housing and one side of the support plate being coplanar with the housing, the housing made of polycarbonate and glass fiber and the support plate made of transparent polycarbonate;
    providing a liquid crystal display assembly attached to the support plate;

providing a decorative member mounted on the housing opposite to the liquid crystal display assembly.

7. The method for manufacturing the front cover as claimed in claim 6, wherein the support plate is integrally formed in the opening of the housing by dual-material dual-injection molding.

* * * * *